(No Model.)

W. B. GRIFFITHS.
DEVICE FOR LAYING OFF GEOMETRICAL FIGURES.

No. 462,126. Patented Oct. 27, 1891.

WITNESSES:
William Miller
Edward Wolff

INVENTOR:
Walter B. Griffiths
BY
Van Santvoord & Hauff
ATTORNEYS

United States Patent Office.

WALTER B. GRIFFITHS, OF NEW YORK, N. Y.

DEVICE FOR LAYING OFF GEOMETRICAL FIGURES.

SPECIFICATION forming part of Letters Patent No. 462,126, dated October 27, 1891.

Application filed April 25, 1891. Serial No. 390,443. (No model.)

*To all whom it may concern:*

Be it known that I, WALTER B. GRIFFITHS, a citizen of the United States, residing at New York, in the county and State of New York, have invented new and useful Improvements in Devices for Laying Off Geometrical Figures and Designs, of which the following is a specification.

This invention relates to certain improvements in a device for laying off geometrical figures and other designs, said improvements being pointed out in the following specification and claim, and illustrated in the accompanying drawings, in which—

Figure 1:
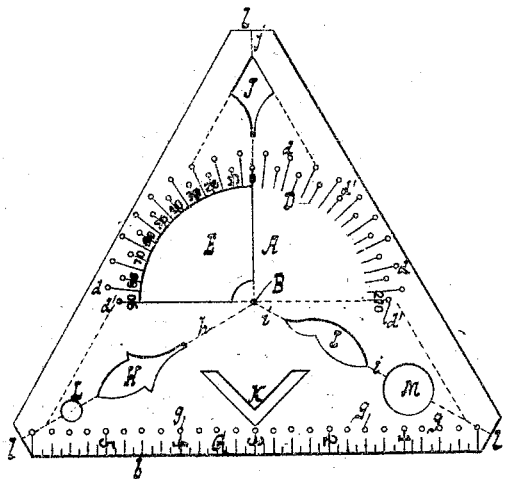
Figure 2:
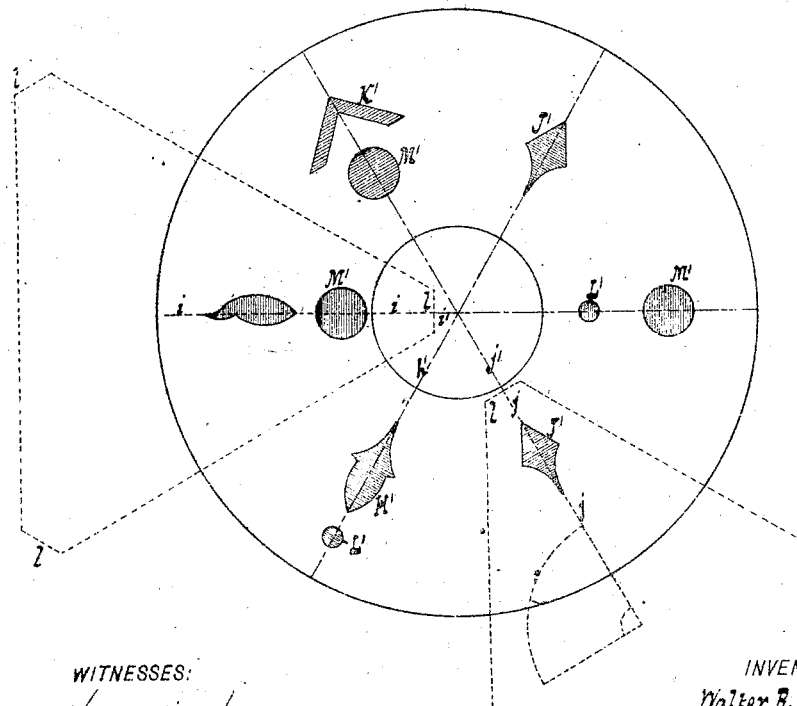

Figure 1 represents a face view of a device embodying my invention. Fig. 2 is a face view of a design indicating the manner in which my device can be used.

In the drawings, the letter A designates a polygonal disk, which can be in the form of a triangle, preferably equilateral, as shown in this example. Within the body of the disk is a hole or perforation B, which is sufficiently large to receive a pin, about which, as a center, the disk can be rotated. On the surface of the disk is engraved or stamped a protractor D, with the perforation B as a center, and the material forming one quadrant of the protractor is cut away to form an opening E, in order that the degrees can be transferred upon the sheet to be drawn upon. On the center ends of the lines which indicate the degrees of the protractor are made holes $d$ $d'$, through which the pencil-point can pass. By inserting the pencil-point through one of said holes and rotating the disk round a pin inserted through the hole B a circle of a determined diameter can be drawn, which can be divided into a number of equal parts by passing the pencil-point through selected equidistant holes $d$ or $d'$. The base $b$ of the triangular disk is provided with a scale G, and on the inner ends of the division-lines of this scale are perforations $g$, so that by passing a pin through one of these perforations and passing the pencil-point through another perforation a circle can be described the radius of which is equal to the distance between the two perforations. In the body of the disk openings are cut to form ornamental designs H, I, J, and K, and also circles of various diameters, such as L and M, and through the designs H, I, and J and also through the circles L M are drawn radial lines $h$ $i$ $j$, which assist materially to locate said designs in the exact position. It will also be seen that the corners $l$ of the disk A are cut away at right angles to the radial lines $h$ $i$ $j$, so that the ends of these radial lines can be easily and correctly placed over corresponding radial lines $h'$ $i'$ $j'$, on which the various designs H' I' J' L' M' are to be located, as indicated in Fig. 2.

My device can be used with great advantage for laying out patterns for lace curtains, borders for paper hangings, and other articles, and it can also be used with advantage for educational purposes.

I distinctly disclaim in my present application everything shown and described in Letters Patent No. 364,508, granted to me June 7, 1887.

What I claim as new, and desire to secure by Letters Patent, is—

A disk forming an equilateral triangle having its corners cut away in the lines $l$ and provided with a center B, ornamental designs H I J, and circular openings L M, situated on radial lines $h$ $i$ $j$, which extend from the center of the disk to the lines $l$, substantially as described.

In testimony whereof I have hereunto set my hand in the presence of two subscribing witnesses.

WALTER B. GRIFFITHS.

Witnesses:
 WM. C. HAUFF,
 E. F. KASTENHUBER.